M. Terrill. Evener.
117123  PATENTED JUL 18 1871
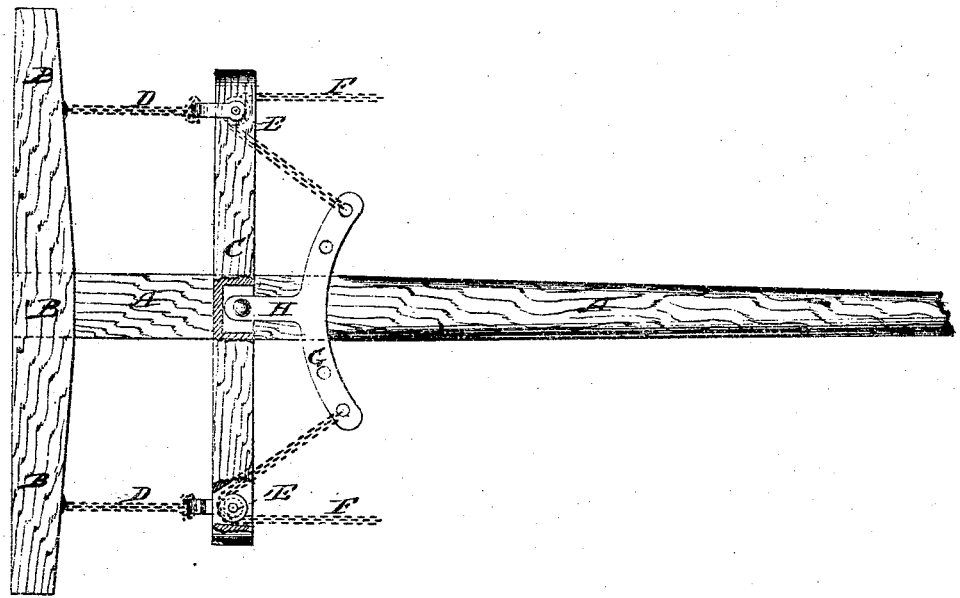
Witnesses:
P. C. Dieterich.
Wm H. C. Smith.
Inventor:
M. Terrill.
PER
[signature]
Attorneys.

UNITED STATES PATENT OFFICE.

MARVIN TERRILL, OF STAR PRAIRIE, WISCONSIN.

IMPROVEMENT IN EVENERS.

Specification forming part of Letters Patent No. 117,123, dated July 18, 1871.

*To all whom it may concern:*

Be it known that I, MARVIN TERRILL, of Star Prairie, in the county of St. Croix and State of Wisconsin, have invented a new and Improved Evener; and I do hereby declare that the following is a full, clear, and exact description thereof, which will enable others skilled in the art to make and use the same, reference being had to the accompanying drawing forming part of this specification.

This invention relates to improvements in equalizing-eveners for equalizing the draft of the horses of a team; and it consists in a vibrating bar applied, in connection with one which does not vibrate, in a novel manner, as hereinafter described, for favoring the hindmost horse.

The drawing is a plan view of my improved evener apparatus applied to a tongue.

A is the tongue. B may represent the axle or any cross-bar which cannot vibrate. C is another cross-bar, taking the place of the ordinary evener, but prevented from vibrating by the ends being connected to B by chains D. The bar has a pulley, E, fitted in a mortise in each end, over which the chains F work, which connect the whiffletrees with a curved bar, G, crossing the tongue in advance of the bar C, and having a tongue, H, extending rearward from its center to the bar C, where it is pivoted to the latter; also, to the tongue. This bar is free to vibrate, and is so shaped that, as one end is drawn back by the horse most in advance and the other goes forward, the leverage is shifted in favor of the hindmost horse by the line of draft at the end swinging back approaching the right line between the pivot of H and the wheel E, while at the other side the line of draft of the hindmost horse approaches a line perpendicular to the said right line between said pivot and the roller. The said equalizing-bar G has several holes at each side of the center for shifting the draft-chains from one to another, as may be required, for favoring one horse over another.

Having thus described my invention, I claim as new and desire to secure by Letters Patent—

The combination, with the bar C, held against vibration and provided with the friction-rollers E, of the equalizing-bar G and the whiffletree-chains F, all substantially as specified.

MARVIN TERRILL.

Witnesses:
GEO. FRISSELL,
PETER MCGREGOR.